(12) United States Patent
Nagesh et al.

(10) Patent No.: US 7,493,125 B2
(45) Date of Patent: Feb. 17, 2009

(54) METHODS AND APPARATUS FOR PROVIDING LOCATION ENABLED RING TONES OR RING BACKS

(75) Inventors: Harsha S. Nagesh, Berkeley Heights, NJ (US); Viswanath Poosala, Basking Ridge, NJ (US); Shengqiang Wang, Raleigh, NC (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 678 days.

(21) Appl. No.: 11/150,540

(22) Filed: Jun. 10, 2005

(65) Prior Publication Data

US 2006/0291640 A1    Dec. 28, 2006

(51) Int. Cl.
*H04Q 7/20* (2006.01)
(52) U.S. Cl. .................. 455/456.1; 455/566; 455/567; 455/414.2; 455/415

(58) Field of Classification Search ............. 455/414.2, 455/415, 422.1, 566, 567
See application file for complete search history.

(56) References Cited

FOREIGN PATENT DOCUMENTS

| EP | 1 408 711 A1 | 4/2004 |
| EP | 1 517 527 A1 | 3/2005 |
| WO | WO 2005/004453 A1 | 1/2005 |

*Primary Examiner*—Temica M Beamer (57) ABSTRACT

Personalized location enabled indicators, such as ring backs or ring tones are described. Such capability can be provided by wireless service providers to offer their customers a host of unique location based ring tones and ring backs of both an audio and video nature. By way of example, a first calling party may be provided with a video ring back indicative of location, such as a picture of the Golden Gate Bridge when a second called party is in San Francisco, or a ring tone may indicate a called party is at work and busy, at home and not busy, or the like, with different ring tones for different classes of callers, such as coworkers, family, friends or specified individuals.

20 Claims, 5 Drawing Sheets

METHODS AND APPARATUS FOR PROVIDING LOCATION ENABLED RING TONES OR RING BACKS

FIELD OF THE INVENTION

The present invention relates generally to improvements in the field of mobile communication, and, in particular, to systems and methods for providing personalized location enabled indicators, such as ring tones or ring backs.

BACKGROUND OF THE INVENTION

Ring tones and ring backs are a growing business in the world of telecommunications. Cellular or wireless subscribers in many parts of the world are eager to buy and exchange new ring tones and also set ring back preferences. On the one hand, ring tones are the sounds, such as rings, for example, played on mobile phones upon receiving a call. Simply by way of example, it is not uncommon for a user to download a ring tone which is part of a favorite song or which is selected from a menu of options with many distinctive choices. Today's phones typically provide the user with the capabilities of setting different ring tone preferences based on the caller and even time of day.

Ring backs, on the other hand, are typically sound bytes sent back to the calling party after a call has been dialed depending on preferences set by the called party. While ring tones can be supported by software technology residing purely on the handset, supporting ring backs requires extensive support from the wireless network during the call setup stage. Lucent Technologies Inc. of 600 Mountain Avenue, Murray Hill, N.J. 07974, a provider of communications products and services, has developed a product called MiRingBack that enables service providers to deploy sophisticated ring back solutions in their wireless networks.

iLocator is a location based service platform also from Lucent Technologies Inc. which supports custom location and presence based services such as alerting and tracking family, friends and enterprises, incorporating privacy controls. Among its many capabilities, it interfaces with the Intelligent Services Gateway (ISG) product from Lucent Technologies Inc. to obtain network related information.

SUMMARY OF THE INVENTION

Among its several aspects, the present invention recognizes that the capabilities of the aforementioned products can be advantageously combined as taught herein to provide a wide array of personalized location indicators, such as personalized location enabled ring backs and ring tones, as described further herein. While it is hard to envision all the creative uses that service providers may want to offer or mobile users may want, several illustrative examples are discussed below. With the present invention, a user could set different personalized ring backs or ring tones to be sent back to a specific set of callers based on the user's location. For example, a first tone could indicate to coworkers that the user is at work, but would indicate that he was busy to friends. A second tone could indicate that he is at work, but not busy to family members. A third tone could be employed to indicate that the user is downtown, and a fourth tone could be used to indicate that the user is at home and not busy.

As an alternative or in addition, a user could set a preference such that selected callers get an automated message that indicates the current location of the user, while the call is being connected.

Callers with phones that have multimedia messaging service (MMS) capability could advantageously receive an MMS message indicating the current location of the called party. For example, an MMS message may include a picture of Times Square if the called party is in New York City, a picture of the White House if the called party is in Washington D.C., or simply a map of the current location of the user.

To this end, the present invention addresses among its several aspects a method for providing a personalized location enabled indicator, such as a ring tone or ring back, comprising: obtaining location information for a mobile device of a called party; and providing the personalized location enabled indicator to the calling party, said personalized location enabled indicator being a function of the location information for the mobile device of the called party. In a further aspect, the step of obtaining location information is done as part of call set up.

According to another aspect, the present invention addresses a system for providing a personalized location enabled indicator, such as a ring tone or ring back, the system comprising: means for obtaining location information for a mobile device of a called party; and means for providing said personalized location enabled indicator to the calling party, said location enabled indicator being a function of the location information for the mobile device of the called party. Aspects of the system may be embodied in a wireless base station or a cellular telephone handset.

A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

As will be appreciated by one of skill in the art, the present invention may be embodied as methods, systems, or computer readable media. Accordingly, aspects of the present invention may take the form of a hardware embodiment, a software embodiment or an embodiment combining software and hardware aspects such as firmware. Furthermore, the present invention may take the form of a computer program on a computer-usable storage medium having computer-usable program code embodied in the medium. Any suitable computer readable medium may be utilized including hard disks, CD-ROMs, optical storage devices, flash memories, magnetic storage devices, or the like.

Computer program code or "code" for carrying out operations according to the present invention may be written in an object oriented programming language such as JAVA®, Smalltalk, JavaScript®, Visual Basic®, TSQL, Perl, C, C++ or in various other programming languages. Software embodiments of the present invention do not depend on implementation with a particular programming language. Portions of the code may execute entirely on one or more systems utilized by a network server or a wireless device.

Figure 1:
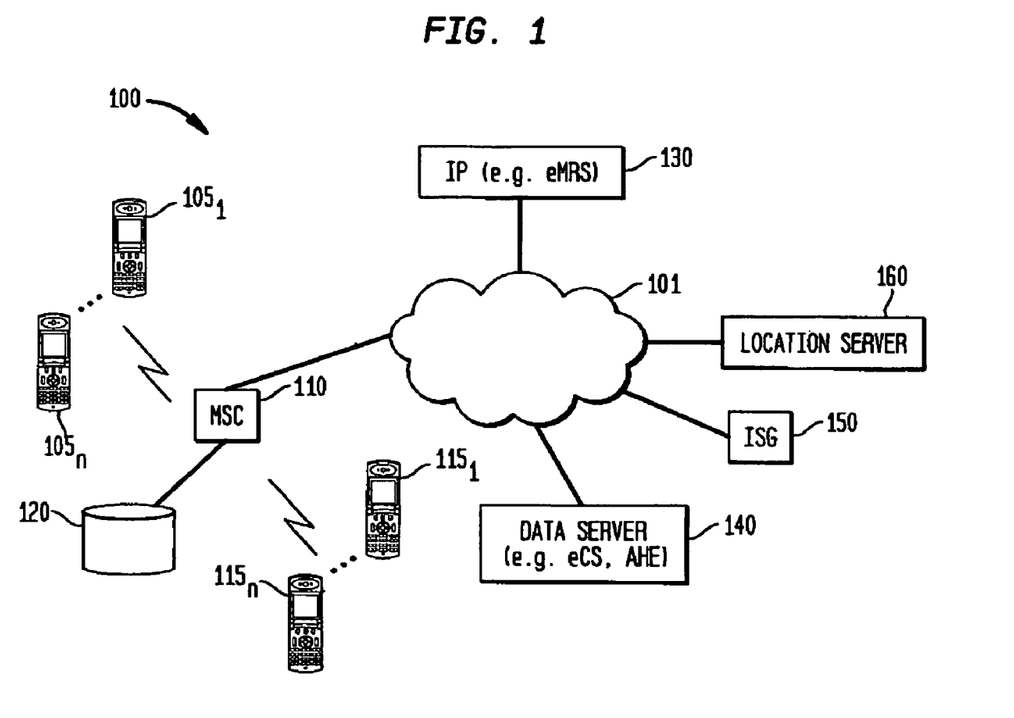
FIG. 1 illustrates an exemplary network system in accordance with the present invention.

The code may execute partly on one network server and partly on another network server or on a mobile or wireless device in communication with the network server over a communications network. Regarding the former scenario, FIG. 1 shows an exemplary system 100 for providing personalized location enabled indicators, such as personalized ring tones or ring backs, in accordance with the present invention. The system 100 includes an intelligent network (IN) 101 which provides a medium for establishing a call between wireless devices such as wireless devices $105_1$-$105_n$ and wireless devices $115_1$-$115_n$. A mobile device may be a wireless device, a cellular or wireless phone, or some other type of mobile device, such as an Internet protocol (IP) phone or mobile network device which is mobile and communicates with multiple other users for which a personalized location indicator, such as specific ring tones or ring backs, might be considered valuable. The system 100 includes a mobile switching center (MSC) 110 coupled to a set of intelligent network (IN) devices including an intelligent peripheral server 130 such as Lucent Technologies' enhanced media resource server (eMRS), a data server 140 such as Lucent Technologies' enhanced control server (eCS), an intelligent services gateway (ISG) 150 such as Lucent Technologies' MiLife® ISG, and a location server 160, such as Lucent Technologies' iLocator server.

MSC 110 provides wireless device voice and data connectivity to the intelligent network 101. MSC 110 includes an optional database 120 to determine whether a called party subscribes to a ring back service, such as MiRingBack. MSC 110 also includes a function of acting as a service switching point (SSP) which allows MSC 110 to communicate using signaling system 7 (SS/7) signaling protocol. In particular, integrated services digital network user part (ISDNUP) messaging is used to initiate a call. However, other protocols may also be used, such as ISDN messaging protocols, and the like. Although wireless devices $105_1$-$105_n$ and $115_1$-$115_n$ are shown to communicate with MSC 110, it will be recognized that multiple MSCs couple to intelligent network 101 and, depending on the location of a wireless device, the wireless device may communicate through another MSC. Also, while phones are shown for purposes of illustration, many other mobile devices with communication capabilities are also contemplated. After a call is established between one or more wireless devices over intelligent network 101, a voice communication path may be carried over intelligent network 101 or another network to which MSC 110 may connect, such as a public switched telephone network (PSTN) which is not shown.

Intelligent peripheral server 130 provides MSC 110 intelligent network features such as distributing call processing capabilities across multiple intelligent network devices. Data server 140 contains an intelligent database service that offers large database capabilities, including sort call handling and routing information for intelligent network (IN) services executed by service switching points (SSPs), such as MSC 110. In particular, data server 140 contains predetermined profiles of subscribers to a ring back service, such as the MiRingBack service adapted in accordance with the teachings of the present invention. A profile may include subscriber preferences such as rules for sending different sound bytes to a calling party before call establishment depending on the location or presence of the subscribed party. Additionally, the different sounds may depend upon whether the calling party falls into a predetermined category, such as family, friend, coworker, high priority caller, or the like. The profile may also contain other call treatment rules such as sending a map showing the location of the called party or a tailored message depending on the location of the called party, the calling party, or both. The data server 140 also may suitably execute user preference application code which applies the rules specified in a profile in response to a query.

ISG 150 translates queries made in one communication protocol to another communication protocol. A suitable intelligent services gateway is a parlay/OSA (open services access) standard compliant network element that exposes network capabilities to end user applications. It provides a single entry point regardless of the different flavors of wireless networks such as time division multiple access (TDMA) digital, code division multiple access (CDMA) or universal mobile telecommunications system (UMTS) networks. It also adheres to different wireless standards such as location interoperability forum (LIF) to support querying of location information from the location related elements.

The location server 160 runs server code which provides a location and presence based track and alert service. Wireless devices, such as wireless devices $105_1$-$105_n$, may run client code to receive notifications of the presence and/or location of another wireless device. Location server 160 will be described in further detail in connection with FIG. 4. It will be recognized that the number of intelligent network devices and mobile switching centers which may be used in intelligent network 101 is not limited to the exemplary ones represented in FIG. 1.

It should be further noted that the functionality of the data server 140 and IP server 130 may be combined into one server. While devices $105_1$-$105_n$ are shown as wireless devices, it should be recognized that many aspects of the present invention apply to a wide variety of other mobile devices capable of initiating or receiving telephone calls.

Figure 2:
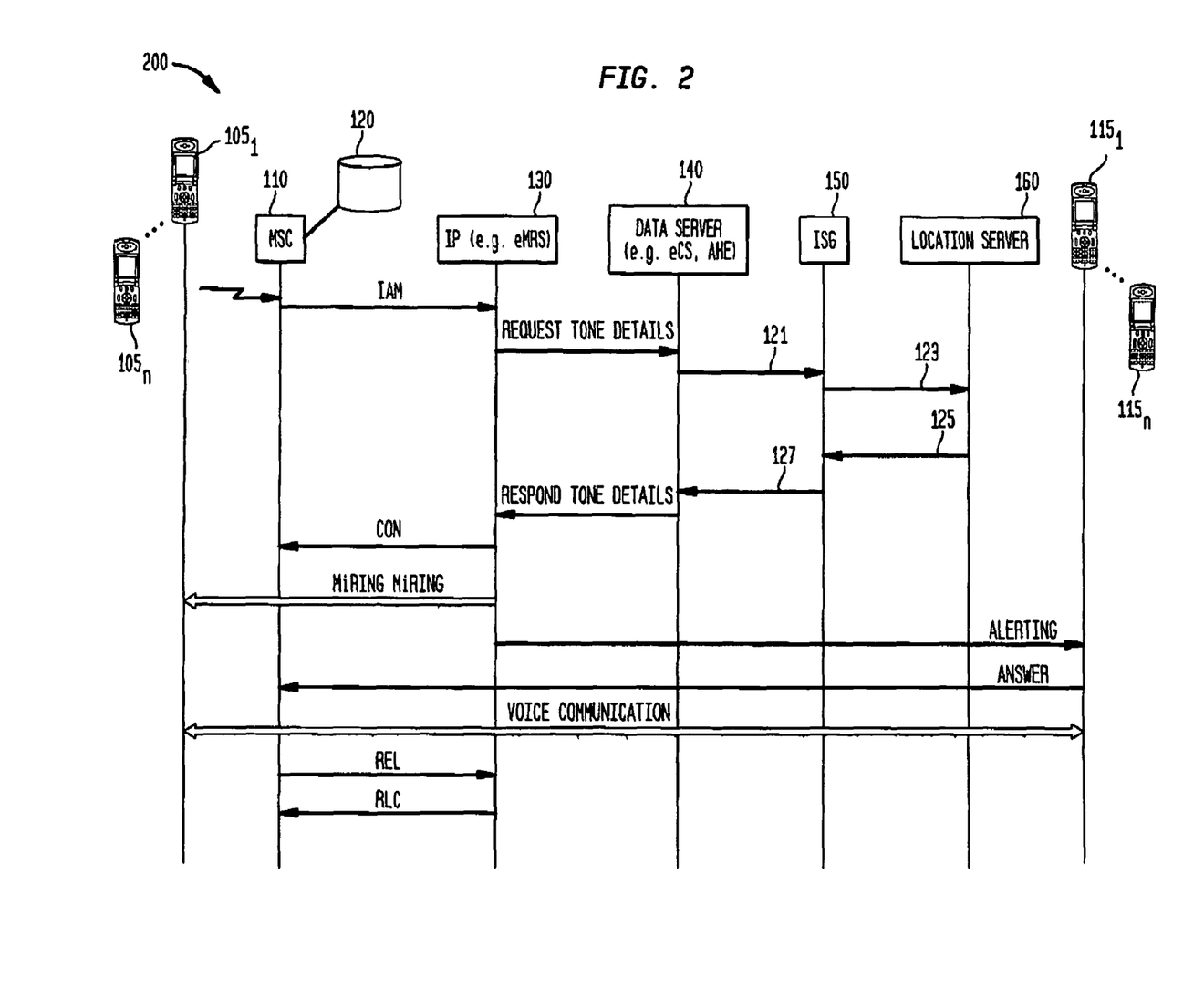
FIG. 2 shows an exemplary call flow between the network elements of FIG. 1 to provide a personalized location specific ring back depending on the location of a called party in accordance with the present invention.

FIG. 2 shows an exemplary call flow 200 in accordance with the present invention. This call flow 200 is shown implemented in conjunction with the system 100 of FIG. 1 to provide a specific ring back depending on the location of the cellular wireless phone of a called party. It will be recognized that call flow 200 can be readily implemented with other ring back systems. The approach of call flow 200 incorporates a comprehensive set of network operational scenarios that account for network element failures, called party roaming outside the network, and the like. When a mobile switching center (MSC) 110 receives a request for a call from a calling party using a wireless device $105_1$, it queries a database 120 to determine if a called party using a second wireless phone $115_1$ or other mobile device is a subscriber of the ring back service. If the ring back service has been activated, the MSC 110 queries the intelligent peripheral (IP) 130 for the appropriate ring tone to be sent back to the caller by sending an initial address message (IAM) or other like message. The intelligent peripheral 130 then sends a request for tone details message to data server 140.

In order to support location and presence enabled ring back preferences, the intelligent peripheral 130 or data server 140 also queries intelligent services gateway (ISG) 150 with a query 121 to obtain the current location of the called party. Query 121 contains the address of the called party. Query 121 can be initiated directly to the ISG 150 or to the location server 160. A direct interface to ISG 150 is suitable when only the location of the called party needs to be determined. However, when a location based MMS message, for example, a map of the current location of the called party is to be delivered as the ring back, it is beneficial for the intelligent peripheral server 130 to interface directly with locator server 160 which supports this functionality. The latter situation will be described further in connection with the discussion of FIG. 3. In general, the direct connection to the location server is used only when the users are known to be on the same network with a similar wireless technology. In other instances, it is recommended that the calls flow through the ISG 150 which provides a protocol transparency for end user applications.

In the former situation as illustrated in FIG. 2, ISG 150 translates query 121 from a protocol used between IP 130 and ISG 150 such as ISDNUP into a second protocol such as parlay/OSA (open services access) and forwards a query 123 which is similar to query 121 except that its carried over the second protocol. The ISG 150 in turn uses the LIF protocol to talk to the location server 160. The location server 160 tracks subscribers' location information, such as location information for subscribers utilizing wireless devices $115_1$-$115_n$, and contains a database of records indicating the current location of wireless devices $115_1$-$115_n$. By way of example, the location server 160 may suitably employ well known tri-lateration based techniques to compute the locations using signal measurements from three or more base stations. Alternatively, where a mobile device is connecting to the network with a Wi-fi® standard or Bluetooth® standard connection to a hot spot connection point or the like, the phone is registered at the connection point, and as the location of the connection point is known to the system, it can be readily determined that the mobile device is in proximity to the connection point and this location information can be utilized. While two examples are given above as to how location information can be obtained, it will be recognized that other techniques may also be employed.

Upon receipt of query 123, the location server 160, utilizing the address of the called party, queries the database of records to retrieve the location information for the wireless device corresponding to the called party, such as the location information for wireless device $115_1$, for example. The location server 160 then returns the location information for wireless device $115_1$ to ISG 150 in a message 125. The location may contain a raw location of the wireless device $115_1$ specified in latitude and longitude, for example, or may contain a geographic address such as "600 Mountain Ave., Murray Hill, N.J."

Upon receipt of message 125, ISG 150 converts message 125 carried over the second protocol to message 127 which is carried over the first protocol to data server 140. Data server 140, executing user preference application code, retrieves a subscriber profile corresponding to the called party address and applies the rules stored in the profile for generating the appropriate ring back. For example, the returned information for wireless device $115_1$ may trigger a rule in the subscriber profile to send back sound bytes for a first tone indicating that the called party is at work, to send back sound bytes for a second tone indicating that the called party is busy because he or she is at work, or the like. In addition to the returned location of the called party, the rules in the profile may also depend on the calling party's address, the time of day, or the like.

The data server 140 sends a response to tone details message to the intelligent peripheral 130. The response to the tone details message indicates the particular sound bytes which should be generated by the wireless device $105_1$ of the calling party, for example. The intelligent peripheral 130 sends a continuity message (CON) to MSC 110 to indicate that the called party is valid. The ring back service executing on MSC 110 sends ring messages in accordance with the application of the rules in the subscriber profile. For example, if the user of wireless device $115_1$ was in the office and the user of wireless device $105_1$ is only an acquaintance of the user of wireless device $115_1$, the ring back service may send sound bytes which indicate that the user of wireless device $115_1$ is busy and a busy tone would be heard by the acquaintance while coworkers' calls might ring through to the called party when the called party is at his or her desk or would hear a different ring back if he or she were away from his or her desk. By way of another example, regardless of who is calling wireless device $115_1$ while the wireless device $115_1$ is at work, the ring back service may send sound bytes which indicate that the user is busy. By way of another example, the user of wireless device $115_1$ may accept calls in the afternoon while he or she is at work but will not accept calls in the morning. In this case, busy tones would be provided in the morning while audible ringing tones would be provided in the afternoon to callers. It will be clear that a wide variety of advantageous ring tones and ring backs may be provided.

For completeness, if some type of audible ringing tone is provided to the calling party, intelligent peripheral 130 would send an alerting message to wireless device $115_1$. Once the called party answers the call, an answer message is sent to MSC 110 to establish a voice communication path. Although these messages are shown to terminate directly to and from wireless device $115_1$, these messages would typically be sent to and from an MSC servicing wireless device $115_1$. The release (REL) and release complete (RLC) message are sent between MSC 110 and IP 130 when either party disconnects from the call.

Figure 3:
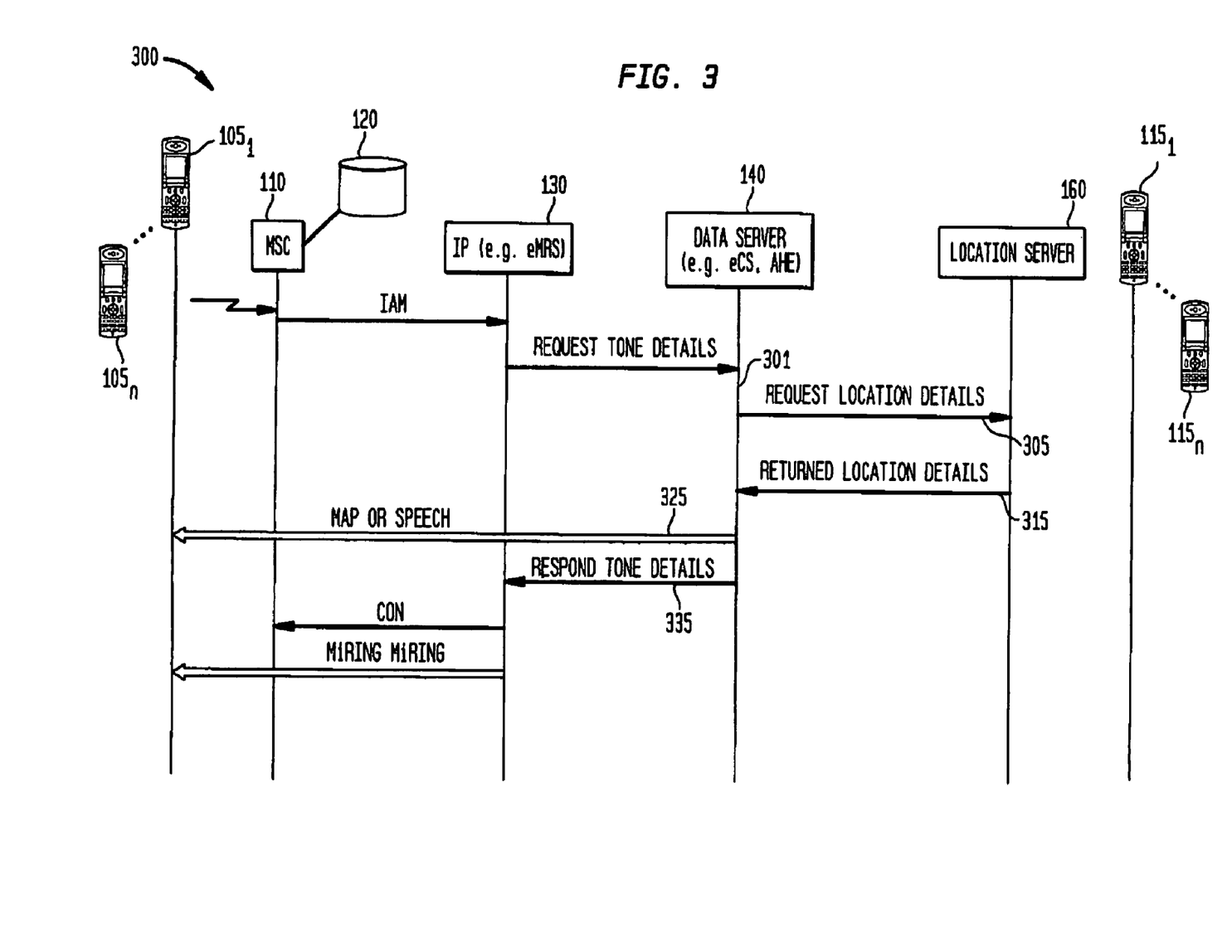
FIG. 3 shows an exemplary call flow between the network elements of FIG. 1 to provide a personalized location specific multimedia message depending on the location of a called party in accordance with the present invention.

FIG. 3 shows a further exemplary call flow 300 between the network elements of FIG. 1 to provide a multimedia message depending on the location of a called party in accordance with the present invention. Up to point 301, the flows described with respect to FIG. 2 apply in FIG. 3 as well. Upon receipt of a request for tone details message, data server 140 sends a request for location details message 305 to location server 160 to find the location of a called party such as the user of wireless device $115_1$. Location server 160, utilizing the address of the called party, queries its database of records to retrieve the location information for the wireless device corresponding to the called party, such as wireless device $115_1$, for example. The location server 160 then returns the location of wireless device $115_1$ to data server 140 in a returned location details message 315. The location may contain a raw location of the wireless device $115_1$ specified in latitude and longitude, for example, or may contain the geographic address such as "600 Mountain Ave., Murray Hill, N.J."

Data server 140, executing user preference application code, retrieves a subscriber profile corresponding to the called party address and applies the rules stored in the profile for generating an MMS message. The generated MMS message may include a map of where the called party is located, a text or voice recording tailored to the location of the called party, a video of the location of the called party, or the like. For example, the returned location or called party address of wireless device $115_1$ may trigger a rule in the subscriber profile to send back a map indicating the location of the called party. In this example, the returned geographic location is utilized to look up a map stored on data server 140 or an external mapping service coupled through the Internet. By way of a further example involving text tailored to the location of the called party, the returned location is returned to the intelligent peripheral 130. Intelligent peripheral 130 converts text tailored to the location such as "600 Mountain Ave., Murray Hill, N.J.," to speech and passes the speech to a calling party, such as the user of wireless device $105_1$ in MMS message 325. The data server 140 sends a response to tone details message 335. Message 335 will optionally contain a specific audible ring or sound bytes if the called party's profile contains rules to send both specific audible rings in addition to the retrieved map or text message. When a text to speech conversion is necessary, the location text is first sent from the data server to the intelligent peripheral 130, for example, which then performs the translation.

Intelligent peripheral 130 then sends a continuity message to indicate to MSC 110 that the called party is valid. If the message 335 contains a specific audible ring, the intelligent peripheral 130 generates the location keyed ring tones to the calling party.

In this exemplary call flow, the calling party devices, such as devices $105_1$-$105_n$, will have a display to display a map, picture, or text keyed to the location of the called party.

Figure 4:
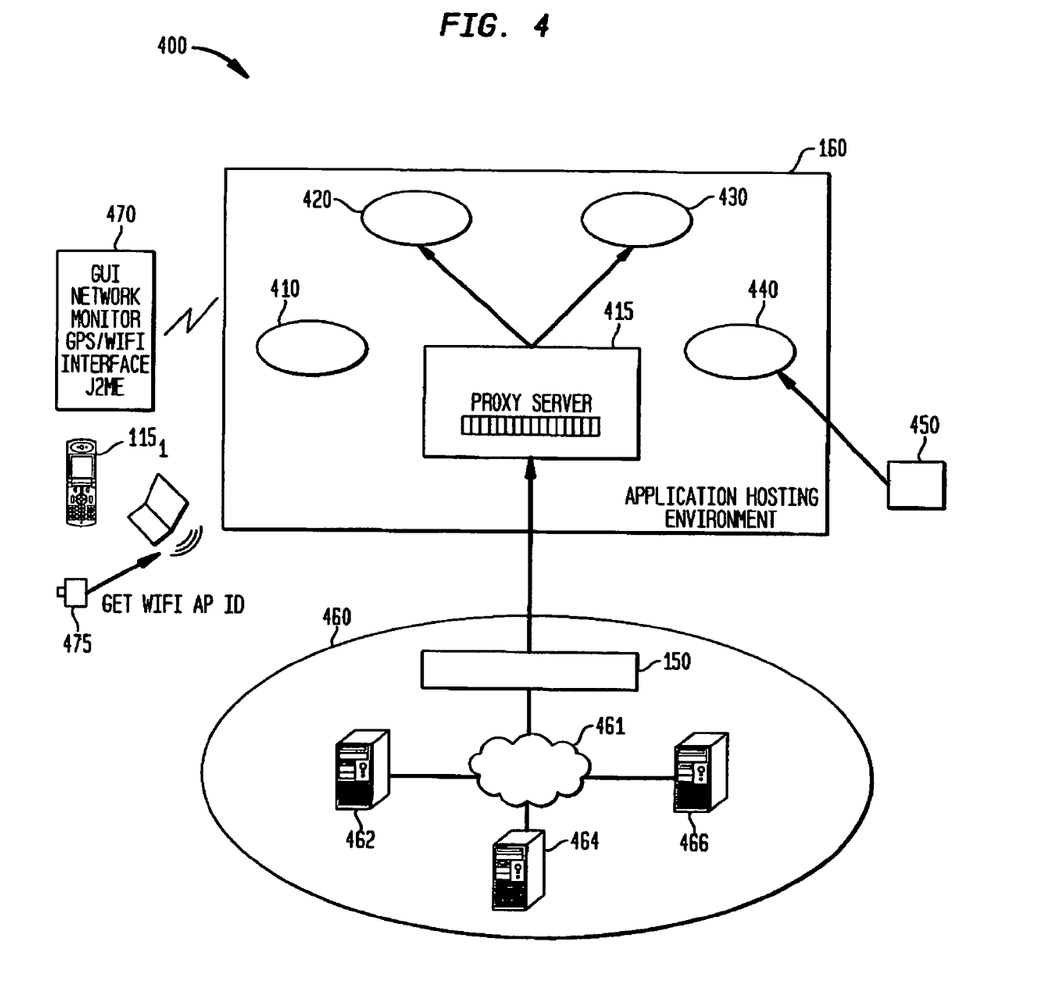
FIG. 4 illustrates exemplary functional components of the location server of FIG. 1 in accordance with the present invention.

Further details of a suitable architecture 400 of a location server 160 interfacing with ISG 150 are shown in FIG. 4. The location server 160 includes several software components including a client renderer 410, a location manager 420, a profile manager 430, server logic 440, and a proxy server 415. The intelligent peripheral 130 maintains the user preferences of what ring tone or ring tones should be played for what location. The location server 160 running code according to the teachings of the invention provides this location information by interfacing with the ISG 150. The location server 160 may be suitably implemented as application host environment (AHE) hardware. The location server 160 may be a front end to ISG 150 to obtain the location plus maps and other information. The location server 160 communicates with Internet protocol multi-media subsystem (IMS) elements 460. The MMS elements may include the ISG 150, a super distributed home location register (SDHLR) user profile information server 462, location servers 464, and enhanced business services provisioning 466.

Client code 470 executes on a mobile device or handset such as wireless device $115_1$. As addressed above, the present location enabled approach is not just limited to cellular networks, but can also obtain the user location from a nearby Wi-fi® access point bypassing the call flow to the ISG 150. Once the location is obtained by interfacing with the ISG 150 or location server 160 as described above, or otherwise, the intelligent peripheral 130 infers the context of the called user and applies the series of ring back tone preferences with their priorities to determine the right ring tone or ring back to be played.

Location server 160 can also play the role of reverse geocoding. In other words, location server 160 can be utilized to translate a raw location of a called user, specified in latitude and longitude, obtained from an ISG, such as ISG 150, to a geographic address, such as "Murray Hill, N.J.". This geographic address is then passed back to the IP server 130 and is converted to synthetic speech which is then sent to the caller just before the ring tone.

Figure 5:
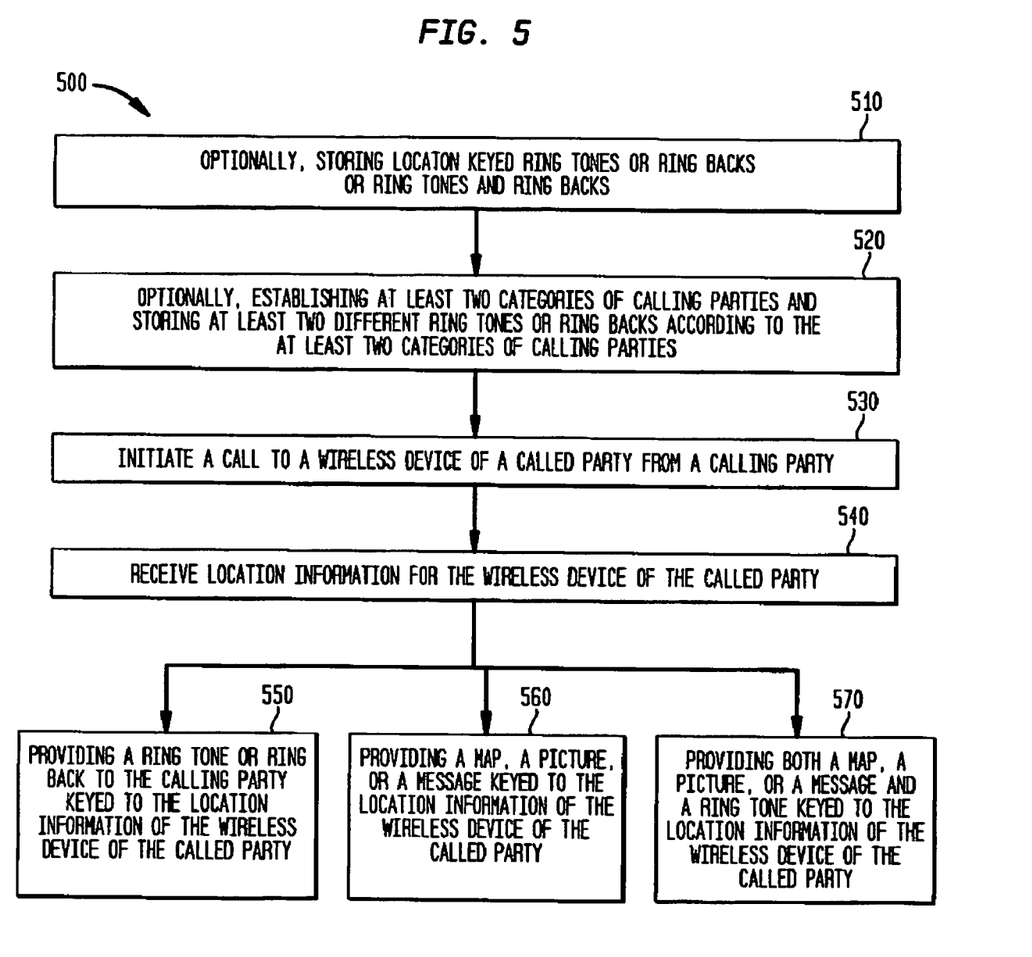
FIG. 5 shows a flowchart of a method for providing personalized location enabled indicators, such as ring tones and ring backs, in accordance with the present invention.

FIG. 5 shows a flowchart of a method 500 for providing personalized location enabled indicators, such as personalized ring tones and ring backs, in accordance with the present invention. Method steps 510 and 520 are optional. At step 510, personalized location indicators, such as ring tones or ring backs or both ring tones and ring backs, are optionally stored for subsequent retrieval. At step 520, at least two categories of calling parties are optionally established. Furthermore, at step 520, at least two different ring tones or ring backs are stored according to the at least two categories of calling parties. Step 520 is optional because this step applies if the ring tones or ring backs provided to a calling party are dependent on the calling party. At step 530, a calling party initiates a call to a wireless device of a called party. At step 540, location information for the wireless device of the called party is obtained or received.

At this point in method 500, three paths may be optionally followed for the next step if desired. If step 550 is selected by a user preselection, a ring tone or ring back which is a function of the location information for the wireless device of the called party is provided to the calling party. If step 560 is selected by a user preselection, a map, a picture, or a message which is a function of the location information for the wireless device of the called party is provided to the calling party. If step 570 is selected by a user preselection, both a map, a picture, or a message and a ring tone which is a function of the location information of the wireless device of the called party is provided to the calling party.

While the present invention has been disclosed mainly in a presently preferred context of cellular or wireless phones, it will be recognized that the present teachings are applicable to a wide array of mobile network accessible devices such as internet protocol (IP) phones, portable game devices, or the like, which can be used at various locations and which could be advantageously located using the present teachings. Further, aspects of the invention can be implemented in a mobile handset or as part of a base station in a wireless phone system.

We claim:

1. A method for providing a personalized location enabled indicator comprising:
   obtaining location information for a mobile device of a called party; and
   providing said personalized location enabled indicator to a calling party, said personalized location enabled indicator being a function of the location information for the mobile device of the called party, wherein the personalized location enabled indicator is a ring tone or ring back, and the method further comprises:
   storing a plurality of location enabled ring tones or ring backs or ring tones and ring backs which are a function of the location information; and
   providing the location enabled ring tone or ring back from the plurality of stored location enabled ring tones or ring backs or ring tones and ring backs.

2. The method of claim 1 wherein said step of obtaining location information is performed as part of call set up of a call from the calling party to the mobile device of the called party.

3. The method of claim 1 wherein the plurality of personalized location enabled ring tones or ring backs includes ring tones or ring backs for locations identified as home and work for the called party.

4. The method of claim 1 further comprising:
   establishing at least first and second categories of calling parties;
   storing at least two different location enabled ring tones or ring backs; and providing a different location ring tone or ring back as a function of the location information depending upon whether the calling party is in the first category or the second category.

5. A method for providing a personalized location enabled indicator comprising:
obtaining location information for a mobile device of a called party; and
providing said personalized location enabled indicator to a calling party, said personalized location enabled indicator being a function of the location information for the mobile device of the called party, the method further comprising:
retrieving a map, a picture, or message as a function of the location information received for the mobile device of the called party; and
providing the map, the picture, or message to the mobile device of the calling party.

6. A system for providing a personalized location enabled indicator comprising:
means for obtaining location information for a mobile device of a called party; and
means for providing said personalized location enabled indicator to a calling party, said location enabled indicator being a function of the location information for the mobile device of the called party, wherein said personalized location enabled indicator is a ring tone or ring back, the system further comprising:
a memory storing a plurality of location enabled ring tones or ring backs or ring tones and ring backs; and
means for providing the location enabled ring tone or ring back from the memory storing the plurality of stored location keyed ring tones or ring backs or ring tones and ring backs.

7. The system of claim 6 wherein said means for obtaining operates to obtain location information as part of call set up of a call from the calling party to the mobile device of the called party.

8. The system of claim 6 wherein the plurality of location enabled ring tones or ring backs or ring tones and ring backs includes ring tones or ring backs which are a function of at least locations identified as home and work for the called party.

9. The system of claim 6 further comprising:
a memory storing at least first and second categories of calling parties;
said memory storing at least two different location enabled ring tones or ring backs keyed for the same location information; and
means for providing a different location enabled ring tone or ring back for the same location information depending upon whether the calling party is in the first category or the second category.

10. The system of claim 6 wherein the system is embodied in a base station of a wireless telephone network.

11. A system for providing a personalized location enabled indicator comprising:
means for obtaining location information for a mobile device of a called party; and
means for providing said personalized location enabled indicator to a calling party, said location enabled indicator being a function of the location information for the mobile device of the called party, the system of comprising:
means for retrieving a map, a picture, or message which is a function of the location information received for the mobile device of the called party; and
means for providing the map, the picture, or message to the mobile device of the calling party.

12. A system for providing a personalized location enabled indicator comprising:
means for obtaining location information for a mobile device of a called party; and
means for providing said personalized location enabled indicator to a calling party, said location enabled indicator being a function of the location information for the mobile device of the called party, wherein the means for providing a personalized location enabled indicator to the calling party further comprises a profile having rules describing subscriber preferences.

13. The system of claim 12 wherein the system comprises a handset.

14. The system of claim 12 wherein said means for obtaining operates to obtain location information as part of call set up of a call from the calling party to the mobile device of the called party.

15. The system of claim 12 wherein said personalized location enabled indicator is a ring tone or ring back, the system further comprising:
a memory storing a plurality of location enabled ring tones or ring backs or ring tones and ring backs; and
means for providing the location enabled ring tone or ring back from the memory storing the plurality of stored location keyed ring tones or ring backs or ring tones and ring backs.

16. The system of claim 12 further comprising:
a memory storing at least first and second categories of calling parties;
said memory storing at least two different location enabled ring tones or ring backs keyed for the same location information; and
means for providing a different location enabled ring tone or ring back for the same location information depending upon whether the calling party is in the first category or the second category.

17. A computer-readable medium whose contents cause a computer system to provide a personalized location enabled indicator by performing the steps of:
obtaining location information for a mobile device of a called party; and
providing the personalized location enabled indicator to the calling party, said personalized location enabled indicator being a function of the location information for the mobile device of the called party, the computer-readable medium further causing the computer system to perform the steps of:
storing a plurality of personalized location enabled ring tones or ring backs or ring tones and ring backs; and
providing the personalized location keyed ring tone or ring back from the plurality of stored location keyed ring tones or ring backs or ring tones and ring backs.

18. The computer-readable medium of claim 17 wherein the plurality of personalized location enabled ring tones or ring backs includes ring tones or ring backs which are a function of at least locations identified as home and work for the called party.

19. The computer-readable medium of claim 17 further comprising:
establishing at least first and second categories of calling parties;
storing at least two different location enabled ring tones or ring backs for the same location information; and providing a different location enabled ring tone or ring back for the same location information depending upon whether the calling party is in the first category or the second category.

20. A computer-readable medium whose contents cause a computer system to provide a personalized location enabled indicator by performing the steps of:

obtaining location information for a mobile device of a called party; and providing the personalized location enabled indicator to the calling party, said personalized location enabled indicator being a function of the location information for the mobile device of the called party, the computer-readable medium further causing the computer system to perform the steps of:

retrieving a map, a picture, or message which is a function of the location information received for the mobile device of a called party; and providing the map, the picture, or message to the mobile device of the calling party.

* * * * *